United States Patent [19]

Lechner

[11] 4,248,568

[45] Feb. 3, 1981

[54] ROTOR BLADE STRUCTURE AND MOUNTING FOR VERTICAL AXIS WIND MACHINES

[76] Inventor: William L. Lechner, P.O. Box 1598, Pittsfield, Mass. 01201

[21] Appl. No.: 102,375

[22] Filed: Dec. 11, 1979

[51] Int. Cl.³ .............................................. F03D 3/06
[52] U.S. Cl. ................................ 416/132 B; 416/119; 416/240
[58] Field of Search ............... 416/240 A, 132 B, 119, 416/197 A

[56] References Cited

U.S. PATENT DOCUMENTS

| | | | |
|---|---|---|---|
| 509,866 | 12/1893 | Bradford | 416/132 B X |
| 556,396 | 3/1896 | Auld | 416/142 B |
| 2,015,777 | 10/1935 | Belding | 416/132 B |
| 2,319,286 | 5/1943 | Andresen | 416/205 X |
| 3,995,170 | 11/1976 | Graybill | 416/119 X |

*Primary Examiner*—Everette A. Powell, Jr.
*Attorney, Agent, or Firm*—D. Paul Weaver

[57] ABSTRACT

A lightweight simplified economical and efficient sail or rotor blade for a vertical axis wind machine and simplified self-acting restraining means for the blade during rotor operation are disclosed. The rotor structure is characterized by ease of assembly and the absence of need for adjustment and frequent maintenance. Individual rotor blades are attached to vertical axis whips extending above and below horizontal rotor arms. The rotor is self-starting and turns in one direction only in response to wind coming from any direction on the compass.

1 Claim, 7 Drawing Figures

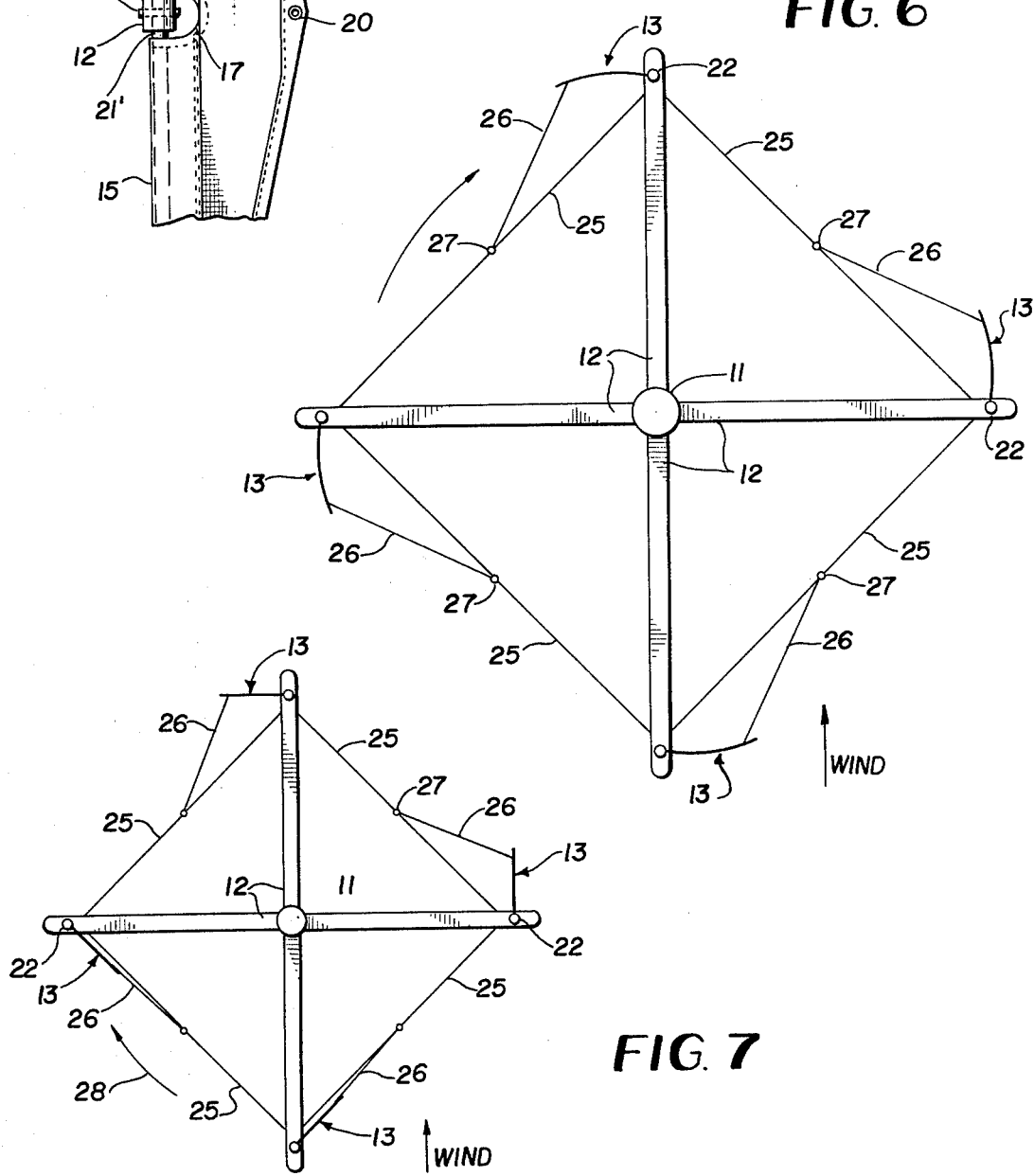

ROTOR BLADE STRUCTURE AND MOUNTING FOR VERTICAL AXIS WIND MACHINES

BACKGROUND OF THE INVENTION

Vertical axis wind machines of various forms and for various purposes are well known in the prior art. These machines differ widely in construction, cost of manufacturing and operational efficiency. Many are costly, unduly complex and unnecessarily fragile, and therefore generally impractical.

The objective of this invention is to provide an improved rotor and rotor blade construction and mounting for a vertical axis wind machine which is very lightweight and low in cost and highly simplified in construction without sacrifice of durability and operational efficiency. More particularly, the present invention seeks to provide a rotor blade arrangement and control or restraint means for the individual blades of the rotor which are entirely practical and automatic in operation regardless of wind direction, so as to assure rotor start-up and continued rotation in the same direction when wind is impinging on the rotor from any point on the compass.

While the invention is not restricted as to usage, it is ideally suited for electrical power for hot water generation and direct power take-off for other energy demands. Conventional rotor braking means, blade spoilers and automatic blade restraint release means for runaway or disabled machines can be included, but are not shown or described herein because these conventional elements are not parts of the claimed invention and are not required for a completely operable machine.

BRIEF DESCRIPTION OF THE DRAWINGS

FIG. 5 is a fragmentary side elevation of the blade and whip according to a modification of the invention.

FIG. 6 is a schematic plan view of the spinning rotor.

FIG. 7 is a similar view of the rotor at start-up.

DETAILED DESCRIPTION

Figure 1:
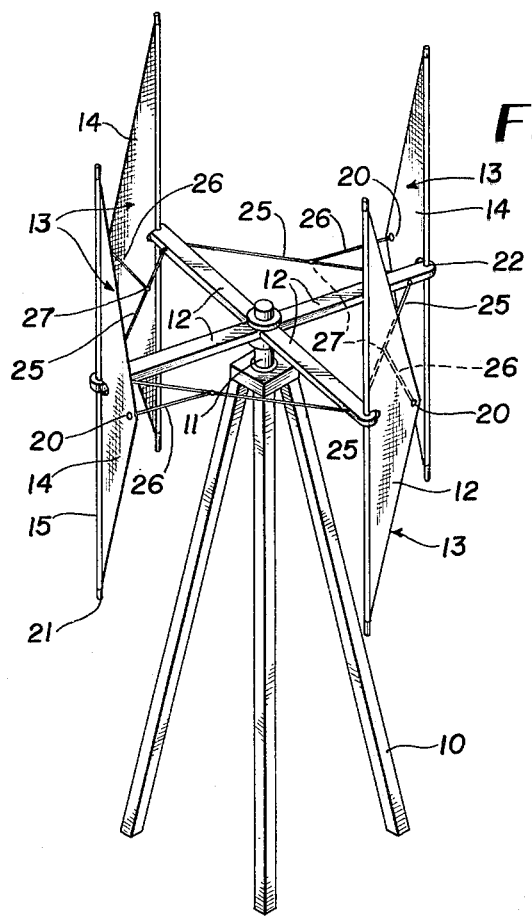
FIG. 1 is a perspective view of a vertical axis wind machine equipped with the rotor and rotor blades according to the present invention.
Figure 2:
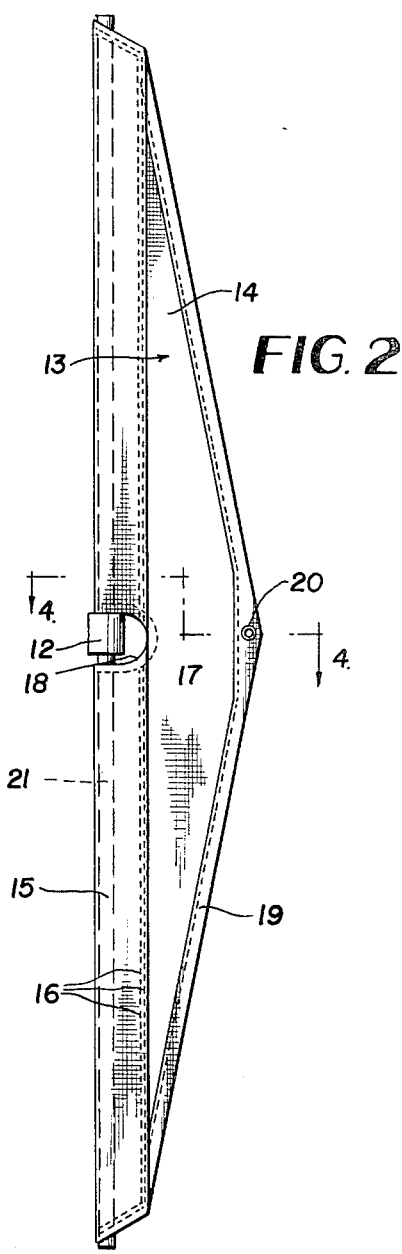
FIG. 2 is a side elevation of one rotor blade with its supporting whip.

Referring to the drawings in detail wherein like numerals designate like parts, the numeral 10 designates a fragment of the tower of a vertical axis wind machine having a driven power take-off shaft 11 to which a suitable number of circumferentially equidistantly spaced horizontal equal length rotor arms 12 are fixedly attached. The number of rotor arms and rotor blades of the wind machine can be varied in accordance with particular needs. Suitable support bearings for the vertical shaft 11, forming no part of the present invention, are provided on the tower 10.

Attached to each rotor arm 12 near its outer end is an approximately triangular blade 13 or sail forming an important element of the invention. Each blade or sail 13 is vertically elongated and extends equidistantly above and below its supporting arm 12. The body portion 14 of each blade 13 is preferably formed from dacron cloth or equivalent durable material which is lightweight. The body portion 14 is flexible.

Figure 3:
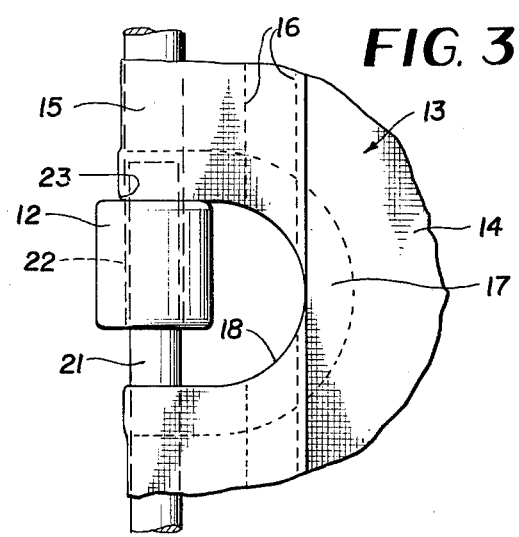
FIG. 3 is an enlarged fragmentary side elevation illustrating the connection of the whip and blade with a rotor arm.
Figure 4:
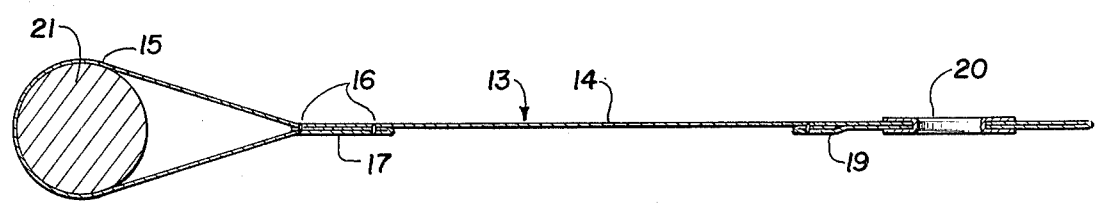
FIG. 4 is an enlarged horizontal section taken on line 4—4 of FIG. 2 and showing details of construction of the blade or sail.

The body portion 14 of each rotor blade has a tubular hem or sleeve 15 formed by lines of stitching 16 along its vertical edge. As shown in FIG. 3, a double thickness arcuate reinforcement 17 is formed at the vertical center of body portion 14 and the body portion is cut away on the interior of the reinforcement 17, as shown at 18 in FIG. 3. The body portion 14 is further hemmed as at 19 around its entire margin and a grommet 20 is placed in the body portion 14 close to the triangle apex of the sail or blade 13.

An elongated vertical rod or whip 21 extends through the tubular hem 15 of each blade 13 and across the cut-out portion 18. The lower end portion of the whip 20 extends loosely through a provided bore 22 formed vertically through each rotor arm 12 close to its outer end. The upper portion of the whip 21 above the rotor arm 12, as best shown in FIG. 3, is slightly enlarged in diameter to provide an annular shoulder 23 which rests on the top face of rotor arm 12. While the whip 21 does not rotate in the bore 22, it does have a free fit therein permitting easy disassembly at any required time. The whip 21 through its shoulder 23 is supported by gravity on the arm 12 and maintains a vertical position at all times.

A variant of the invention shown in FIG. 5 eliminates the shoulder 23 and allows the whip 21 to have a constant diameter throughout its length for easier manufacturing. In lieu of the shoulder 23, a cross pin 24 is inserted through registering opening in the whip and adjacent arm 12 to secure the blade or sail 13 to the arm.

A simple restraining system for the several blades or sails 13 which are free to pivot on the axes of whips 21 is provided in the invention. This restraint system comprises a horizontal guy wire 25 extending between and connecting each adjacent pair of rotor arms 12 to brace them. The wires 25 lie in a common horizontal plane and they form a part of the restraint system for the pivoted blades 13 thereby serving a dual purpose in the invention. The wires 25 are taut.

The system further comprises restraint wires 26, one for each blade 13, one end of each restraint wire 26 being connected to the apex of its associated blade or sail by means of the grommet 20, and the opposite end of each wire 26 being attached firmly with a splicing sleeve to one guy wire 25 at the longitudinal center of the latter as shown at 27 in the drawings. The restraint wires 26 are flexible.

Regardless of wind direction, the rotor is selfstarting and turns in one direction only during operation. The individual blades 13 are capable of oscillating on the axes of the whips 21 through approximately 45 degrees horizontally under the restraining or limiting action of wires 26 and 25.

FIG. 7 illustrates how the wind machine rotor will start up and turn in the direction of the arrow 28. With the wind coming from the indicated direction, such as from the south in FIG. 7, the two southmost or forward blades or sails will assume active thrust positions against and parallel to guy wires 25. Their restraining wires 26 are slack. The other or after two blades 13 will recapture the wind and stand out 90 degrees from the adjacent arms 12 and the associated restraining wires 26 are extended and taut. This will start the rotation of the wind machine rotor, and a similar start-up configuration of blades will take place regardless of wind direction. The rotor will never start up in the wrong or opposite direction due to the geometry of the several blades 13.

FIG. 6 shows the configuration of the rotor when it has gotten up to speed sufficient to maintain all of the blades or sails 13 in their driving positions with their restraining wires 26 taut. The machine as described has uncontrolled rotation but will have inherent controlled rotation by virtue of a continuous engagement with the electric generator and its resistance loading, but state of the art speed regulation, control and braking may be utilized if desirable. The described rotor structure forming the essence of the invention is extremely simple and lightweight, efficient in operation, and practical from all viewpoints as should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a vertical axis wind machine, a rotor drivingly connected to a vertical axis driven shaft, plural circumferentially spaced horizontal rotor arms fixed to said shaft and radiating therefrom, each rotor arm having a vertical through opening near its outer end, a vertical axis whip rod engaged in the through opening of each rotor arm and held therein against axial displacement at least in the downward direction and extending substantially equidistantly above and below the rotor arm, an approximately triangular flexible sail carried by each whip rod and being configured as a shallow isosceles triangle having its long base extending longitudinally of the whip rod and substantially coextensive therewith and having an obtuse angular apex substantially at the horizontal plane of rotation in which the rotor arms are disposed, each flexible sail being constructed to provide thereon a vertical axis tubular hem along said long base and loosely receiving the whip rod above and below the adjacent rotor arm, each sail having a reinforced notch through said hem loosely straddling the adjacent rotor arm, taut horizontal guy elements interconnecting the outer end portions of the rotor arms, and flexible equal length sail restraint elements attached to the guy elements near their centers and being connected to the obtuse angular apices of said sails.

* * * * *